US012384387B2

(12) United States Patent
Mosher et al.

(10) Patent No.: US 12,384,387 B2
(45) Date of Patent: Aug. 12, 2025

(54) AUTOMATICALLY DETERMINING AN UPDATED TIRE SIZE OF TIRES OF A VEHICLE AND INFLUENCING OPERATION OF THE VEHICLE BASED THEREON

(71) Applicant: Powerteq LLC, Ogden, UT (US)

(72) Inventors: Kendall J. Mosher, Fort Collins, CO (US); Anthony R. Pitman, Ogden, UT (US); Michael Jebb, Bellingham, WA (US); Aaron Stewart, Ogden, UT (US)

(73) Assignee: Powerteq LLC, Ogden, UT (US)

( * ) Notice: Subject to any disclaimer, the term of this patent is extended or adjusted under 35 U.S.C. 154(b) by 582 days.

(21) Appl. No.: 17/568,270

(22) Filed: Jan. 4, 2022

(65) Prior Publication Data

US 2023/0211793 A1 Jul. 6, 2023

(51) Int. Cl.
*B60W 50/00* (2006.01)
*B60W 50/14* (2020.01)
*G07C 5/02* (2006.01)

(52) U.S. Cl.
CPC ........ *B60W 50/0098* (2013.01); *B60W 50/14* (2013.01); *G07C 5/02* (2013.01); *B60W 2050/0088* (2013.01); *B60W 2520/10* (2013.01); *B60W 2520/12* (2013.01); *B60W 2530/20* (2013.01); *B60W 2540/215* (2020.02);
(Continued)

(58) Field of Classification Search
CPC ............. B60W 50/0098; B60W 50/14; B60W 2050/0088; B60W 2520/10; B60W 2520/12; B60W 2530/20; B60W 2540/215; B60W 2556/50; B60W 2710/10;
(Continued)

(56) References Cited

U.S. PATENT DOCUMENTS

| 2021/0339757 A1 * | 11/2021 | Rollinger ............ B60W 40/105 |
| 2021/0404449 A1 * | 12/2021 | Kirch ........................ F17D 1/02 |
| 2022/0244736 A1 * | 8/2022 | Konrardy ............... G06Q 40/08 |

FOREIGN PATENT DOCUMENTS

| CN | 113822628 A | * 12/2021 | ............. G06F 16/29 |
| KR | 20080007701 A | * 1/2008 | |

OTHER PUBLICATIONS

Turner, GPS can help with speed accuracy (Year: 2009).*
(Continued)

*Primary Examiner* — Peter D Nolan
*Assistant Examiner* — Chanmin Park
(74) *Attorney, Agent, or Firm* — Dinsmore & Shohl LLP

(57) ABSTRACT

Implementations described herein relate to leveraging corresponding streams of speed readings of a vehicle generated by different speed sensors of different computing devices to automatically determine an updated tire size of tires of the vehicle. For example, while a user of the vehicle is driving, a first stream of speed readings can be generated by a vehicle speed sensor of an in-vehicle computing device of the vehicle and a second stream of speed readings can be generated by a mobile speed sensor of a mobile computing device of the user of the vehicle. Processor(s) can obtain the different streams of speed readings from the different computing devices and process the different streams using various operations to determine the update tire size of the tires of the vehicle. The updated tire size can be subsequently utilized to update operational parameter(s) of the vehicle that influence how the vehicle operates.

20 Claims, 5 Drawing Sheets

(52) U.S. Cl.
CPC ..... *B60W 2556/50* (2020.02); *B60W 2710/10* (2013.01); *B60W 2710/12* (2013.01); *B60W 2710/18* (2013.01)

(58) Field of Classification Search
CPC ......... B60W 2710/12; B60W 2710/18; B60W 40/12; B60W 2520/28; G07C 5/02
See application file for complete search history.

(56) References Cited

OTHER PUBLICATIONS

Sabatini et al., Motorcycle tire rolling radius estimation for TPMS applications via GPS sensing (Year: 2017).*
Lundquist et al., Tire Radii Estimation Using a Marginalized Particle Filter (Year: 2014).*

* cited by examiner

AUTOMATICALLY DETERMINING AN UPDATED TIRE SIZE OF TIRES OF A VEHICLE AND INFLUENCING OPERATION OF THE VEHICLE BASED THEREON

BACKGROUND

Tire size of tires of a vehicle influences how the vehicle operates. For example, speedometer readings of a speedometer of the vehicle, shift points of a transmission of the vehicle, transfer case gearing of the vehicle, axle gearing, and/or other operational parameters of the vehicle may all be influenced based on the tire size of the tires of the vehicle. Typically, when vehicles are manufactured, each of these operational parameters are initially calibrated based on the tire size of stock tires with which the vehicle is manufactured. Humans that subsequently purchase these vehicles (also referred to herein as "users") may switch out the stock tires of the vehicles with custom tires for seasonal reasons (e.g., winter tires vs. summer tires), performance reasons (e.g., highway tires vs. off-road tires), and/or for any other reasons.

However, when these users switch out the stock tires of the vehicles with the custom tires, these operational parameters may no longer be calibrated since the tire size of the custom tires may not match the tire size of the stock tires, and, as a result, the vehicles may perform sub-optimally. This sub-optimal performance of the vehicles may pose a potential harm to the users and/or the vehicles since the speedometer readings may be inaccurate, the shift points of the vehicle may be inaccurate, etc. Accordingly, these users generally take the vehicles back to the manufacturer and/or another third-party vehicle shop to re-calibrate these operational parameters based on the tire size of the custom tires to obviate any potential harm to the users and/or the vehicles by ensuring optimal performance of the vehicles.

SUMMARY

Implementations described herein relate to leveraging corresponding streams of speed readings of a vehicle generated by different speed sensors of different computing devices to automatically determine an updated tire size of tires of the vehicle. The updated tire size of the tires of the vehicle is utilized to update one or more operational parameters of the vehicle that influence how the vehicle operates. Processor(s) can obtain a stream of first speed readings of the vehicle generated by a first speed sensor of a first computing device, obtain a stream of second speed readings of the vehicle generated by a second speed sensor of a second computing device, process the stream of first speed readings and the second speed readings, determine the updated tire size of tires of the vehicle based on a previous tire size of the tires of the vehicle and based on processing the stream of first speed readings and the second speed readings, and cause one or more of the operational parameters for the vehicle to be updated based on the updated tire size of the tires of the vehicle. In some implementations, the first computing device may be an in-vehicle computing device and the first speed sensor may be a vehicle speed sensor of the vehicle, and the second computing device may be a mobile computing device and the second speed sensor may be a mobile speed sensor of the mobile computing device.

For example, assume a user of the vehicle has switched out 32 inch stock tires of the vehicle with 35 inch custom tires for off-road operation of the vehicle. In this example, the difference in size between the previous tires of the vehicle (e.g., the 32 inch stock tires) and the updated tires of the vehicle (e.g., the 35 inch custom tires) may result in incorrect operational parameters of the vehicle (e.g., incorrect speedometer readings of a speedometer of the vehicle, incorrect shift points of a transmission of the vehicle, etc.). Accordingly, techniques described herein enable the user of the vehicle to automatically determine the updated tire size of the tires of the vehicle and to cause the operational parameters of the vehicle to be updated based on the automatically determined updated tire size to influence future operation of the vehicle. Continuing with the example, further assume the user is driving the vehicle and that the user has the mobile computing device on his/her person while driving the vehicle. In this example, the vehicle speed sensor generates a stream of vehicle speed readings for the vehicle as the user drives (e.g., speedometer readings) while the distinct mobile speed sensor of the mobile computing device generates a stream of mobile speed readings for the vehicle (e.g., global positioning system (GPS) readings). Further, the mobile computing device can process the stream of vehicle speed readings and the stream of mobile speed readings using various mathematical operations to determine the updated tire size of the vehicle, and transmit an indication of the updated tire size to the in-vehicle computing device to cause one or more of the operational parameters of the vehicle to be updated, thereby influencing the future operation of the vehicle.

In some implementations, processing the stream of first speed readings and the second speed readings may include normalizing the stream of first speed readings and normalizing the stream of second speed readings, determining a standard deviation between the normalized stream of first speed readings and the normalized stream of second speed readings, and determining whether the standard deviation between the normalized stream of first speed readings and the normalized stream of second speed readings satisfies a threshold. The processor(s) can, in response to determining that the standard deviation satisfies the threshold, generate a correction factor for the vehicle based on one or more normalized first speed readings, from the normalized stream of first speed readings, to one or more normalized second speed readings, from the normalized stream of second speed readings, and determine the updated tire size of the tires of the vehicle based on the correction factor and the previous tire size of the vehicle (e.g., obtained from the in-vehicle computing device or obtained from the user of the vehicle). The standard deviation can be determined, based on, for example, comparing one or more normalized first speed readings from the normalized stream of first speed readings to one or more second speed readings from the normalized stream of second speed readings. Put another way, the different speed readings from the different speed sensors of the different computing devices can be normalized and a standard deviation therebetween can be determined. However, the normalized speed readings may only be utilized in generating the correction factor if the standard deviation between one or more of the normalized first speed readings and one or more of the normalized second speed readings indicates these are acceptable values for generating the correction value (e.g., based on satisfying the threshold).

In some versions of those implementations, normalizing the stream of first speed readings and the stream of second speed readings may include averaging one or more first speed readings, included in the stream of first speed readings, across a duration of time to generate the normalized stream of first speed readings, and averaging one or more second speed readings, included in the stream of second speed readings, across the duration of time to generate the normalized stream of second speed readings. Continuing with the above example, vehicle speed readings, included in the stream of vehicle speed readings, may be obtained at a higher frequency (e.g., more quickly) than the mobile speed readings, included in the stream of mobile speed readings, by virtue of the different types of speed sensors. For instance, the vehicle speed sensor may generate instantaneous or near-instantaneous vehicle speed readings based directly on a speed of the vehicle. In contrast, the mobile speed sensor may generate a stream of speed readings based on global positioning system (GPS) readings, global navigation satellite system (GLONASS) readings, and/or other sources. As a result, the vehicle speed readings may be obtained at a higher frequency than the mobile speed readings. The frequency at which the mobile speed readings are obtained may additionally be based on an operating system of the mobile computing device. For instance, mobile speed readings generated by mobile computing devices that utilize the iOS operating system may generate the mobile speed readings at a first frequency, whereas mobile speed readings generated by mobile computing devices that utilize the ANDROID operating system may generate the mobile speed readings at a different, second frequency. Accordingly, the mobile computing device can normalize the different speed readings generated by the different speed sensors over the duration of time to ensure the different speed readings accurately reflect a speed at which the vehicle thinks it is traveling, but is not actually traveling due to the updated tire size of the tires of the vehicle (e.g., based on the stream of vehicle speed readings), and to reflect a speed at which the vehicle is actually traveling (e.g., based on the stream of mobile device readings).

In some versions of those implementations, in response to determining that the standard deviation fails to satisfy the threshold, the processor(s) can obtain an additional duration of time to be utilized in normalizing the streams of speed readings (e.g., collectively referring to both the stream of first speed readings and the stream of second speed readings). Continuing with the above example, the duration of time over which the vehicle speed readings and the mobile speed readings are compared may be reduced. Accordingly, when the vehicle speed readings and the mobile speed readings are normalized over the reduced duration of time, the speed of the vehicle is likely to have less variance, thereby resulting in an additional standard deviation that is more likely to satisfy the threshold. The processor(s) can continue adjusting the duration of time over which the vehicle speed readings and the mobile speed readings in these and other manners until the standard deviation satisfies the threshold and the updated tire size of the tire size of the vehicle is determined.

In additional or alternative versions of those implementations, in response to determining that the standard deviation fails to satisfy the threshold, the processor(s) can obtain an additional threshold to be utilized in comparison with an additional standard deviation. Continuing with the above example, the threshold with which the standard deviation is compared may be reduced. Accordingly, when an additional standard deviation is determined and compared to the threshold, the additional standard deviation is more likely to satisfy the threshold. The processor(s) can continue adjusting the threshold with which the standard deviations are compared in these and other manners until the standard deviation satisfies the threshold and the updated tire size of the tire size of the vehicle is determined. Put another way, in these and other implementations, if the processor(s) determine that the standard deviation fails to satisfy the threshold, the processor(s) can adjust how the streams of speed readings are normalized and/or how the standard deviation determined and compared to balance accuracy in the resulting updated tire size that is determined and consumption of computational resources at the mobile computing device. For instance, the processor(s) may allow for a threshold deviation from an actual size of the updated tire size if such deviation is acceptable (e.g., +/−0.25 inches) and will result in computational resources being conserved at the mobile computing device.

In some versions of those implementations, the processor(s) may determine the standard deviation between the streams of speed readings in response to determining that one or more conditions are satisfied. The one or more conditions may include, for example, determining the stream of first speed readings is stable for a threshold quantity of first speed readings, or determining the stream of first speed readings is stable for a threshold duration of time. Continuing with the above example, the mobile computing device may only determine the standard deviation between the normalized vehicle speed readings and the normalized mobile speed readings in response to determining that the vehicle speed readings have been stable, such as the vehicle driving at a steady speed of 35 MPH for 60 speed readings or 30 seconds. Notably, in determining whether the one or more conditions are satisfied in this example, the processor(s) utilize the vehicle speed readings and not the mobile speed readings. Put another way, the processor(s) can let the vehicle speed readings drive the processing in that the vehicle speed readings are obtained at a higher frequency than the mobile speed readings. Further, although the mobile speed readings are also a steady speed of across the same duration of time (e.g., 30 seconds in this example), there may be fewer mobile speed readings (e.g., less than 60 speed readings) over the same duration of time, and the mobile speed readings may indicate a different speed than the vehicle speed readings (e.g., 38 MPH) due to the difference between the tire size of the tires of the vehicle and the updated tire size of the tires of the vehicle.

In some versions of those implementations, the processor(s) can generate the correction factor based on one or more first speed readings from the stream of first speed readings and one or more second speed readings from the stream of second speed readings. The correction factor can correspond to, for example, a ratio that is subsequently utilized to determine the updated tire size of the tires of the vehicle. For instance, the ratio and the previous tire size can be multiplied to determine the updated tire size of the tires of the vehicle. Continuing with the example, the ratio may be a fraction determined based on the processing of the streams of speed readings described above, and the fraction can be multiplied by 32 inches (e.g., the previous size of the tires of the vehicle) to determine that the updated tire size of the tires of the vehicle is 35 inches. Moreover, the mobile device can generate and transmit a tire size signal to the in-vehicle computing device that indicates the updated tire size of the tires of the vehicle is 35 inches, and the in-vehicle computing device can cause one or more of the operational parameters of the vehicle to be updated in response to receiving the tire size signal from the mobile computing device. Notably, the ratio should remain the same over time since the updated tire size of the updated tires remains the same over time, and may only deviate if the updated tires of the vehicle are switched out with additional updated tires of the vehicle that are a different size than the updated tires of the vehicle.

In various implementations, the processor(s) may perform the operations described herein in response to receiving user input to automatically determine the updated tire size of the tires of the vehicles. Continuing with the above example, the mobile computing device may have access to a software application (e.g., implemented locally at the mobile computing device or remotely from the mobile computing device (e.g., at one or more remote servers)) associated with automatically determining the updated tire size of the tires of the vehicles. The software application may be implemented as a standalone software application or as part of another software application. In this example, the user input to automatically determine the updated tire size of the tires of the vehicles may be received via a user interface input device of the mobile computing device, such as a display of the mobile computing device, one or more hardware and/or software buttons of the mobile computing device, and/or other user interface input devices. Additionally, or alternatively, the in-vehicle computing device may have access to the software application. In this example, the user input to automatically determine the updated tire size of the tires of the vehicles may be received via a user interface input device of the in-vehicle computing device, such as a display of the in-vehicle computing device, one or more hardware and/or software buttons of the in-vehicle computing device, and/or other user interface input devices. In some implementations, the software application may enable the user to provide the previous tire size of the tires of the vehicle (e.g., in implementations where the processor(s) cannot obtain the previous tire size from the in-vehicle computing device).

In some versions of those implementations, and in response to receiving the user input, the processor(s) can generate output that instructs the user to drive the vehicle at a steady speed. As used herein, steady speed may refer to any speed that is constant or near constant (including minor deviations) over a distance, but may or may not correspond to a particular speed since the steady speed may be restricted based on speed limits of municipalities. Further, the processor(s) can cause the output that instructs the user to drive the vehicle at the steady speed to be provided for presentation to the user via a user interface output device of the mobile computing device of the user and/or the in-vehicle computing device of the vehicle of the user (e.g., via a display, speaker(s), and/or other user interface output devices). Notably, the output can include explicit instructions that instruct the user to drive the vehicle at a steady speed, such as synthesized speech audio data that captures synthesized provided for audible presentation to the user (e.g., synthesized speech of "please drive the vehicle at a steady speed") and/or visual content for visual presentation to the user (e.g., text of "please drive the vehicle at a steady speed"). Additionally, or alternatively, the output can include implicit instructions that instruct the user to drive the vehicle at a steady speed, such as a series of audible cues (e.g., dings and/or other audible cues) to avoid distracting the user while driving.

In some further versions of those implementations, and in response to determining that the user is not driving at a steady speed based on the streams of speed readings, the processor(s) can generate additional output that instructs the user to drive the vehicle at a steady speed. Further, the processor(s) can cause the additional output that instructs the user to drive the vehicle at the steady speed to be provided for presentation to the user via the user interface output device of the mobile computing device of the user and/or the in-vehicle computing device of the vehicle of the user (e.g., via a display, speaker(s), and/or other user interface output devices). In some yet further versions of those implementations, the processor(s) may only generate the additional output in response to determining that the user has not been driving at the steady speed for a threshold duration of time to allow for minor variances in the speed of the user and to avoid distracting the user while driving.

In some versions of those implementations, and in response to determining the updated tire size of the tires of the vehicle, the processor(s) can cause the updated tire size of the tires of the vehicle to be provided for audible and/or visual presentation to the user. In some further versions of those implementations, the processor(s) can automatically cause one or more of the operational parameters to be immediately updated based on the updated tire size (e.g., while the user is driving), whereas in other implementations, the processor(s) can automatically cause one or more of the operational parameters to be the next time that the vehicle is turned off. In some further versions of those implementations, the processor(s) can cause corresponding selectable graphical elements associated with one or more of the operational parameters to be provided for presentation to the user to enable the user to select one or more of the operational parameters to be updated based on the updated tire size of the vehicle.

Although the examples provided above are described with respect to particular implementations, it should be understood that is for the sake of example and is not meant to be limiting. For instance, the processor(s) described herein may be implemented by the in-vehicle computing device rather than the mobile computing device. Also, for instance, the processor(s) described herein may be implemented remotely from both the in-vehicle computing device and the mobile computing device (e.g., via one or more remote servers), but those implementations may introduce additional latency in automatically determining the updated tire size of the tires of the vehicle.

By using the techniques described herein, various technical advantages can be achieved. As one non-limiting example, techniques described herein enable the processor(s) to quickly and efficiently determine the updated tire size of the tires of the vehicle and without requiring the user to drive to and from the manufacturer and/or another third-party vehicle shop to re-calibrate one or more of the operational parameters, thereby reducing consumption of natural resources. As another non-limiting example, techniques described herein enable the processor(s) to balance accuracy in determining the updated tire size of the tires of the vehicle and consumption of computational resources by dynamically adjusting the normalization of the streams of the speed readings and/or the thresholds described herein, thereby conserving computational resources of the computing device that implement the processor(s) and/or network resources utilized in obtaining one or more of the streams of speed readings. As yet another non-limiting example, techniques described herein enable the processor(s) to obviate any potential human error and/or reduce a quantity of computational resources consumed in instances of human error in providing the updated tire size, thereby conserving computational resources of the computing device that implement the processor(s).

The above description is provided as an overview of only some implementations disclosed herein. Those implementations, and other implementations, are described in additional detail herein.

DETAILED DESCRIPTION OF THE DRAWINGS

Figure 1:
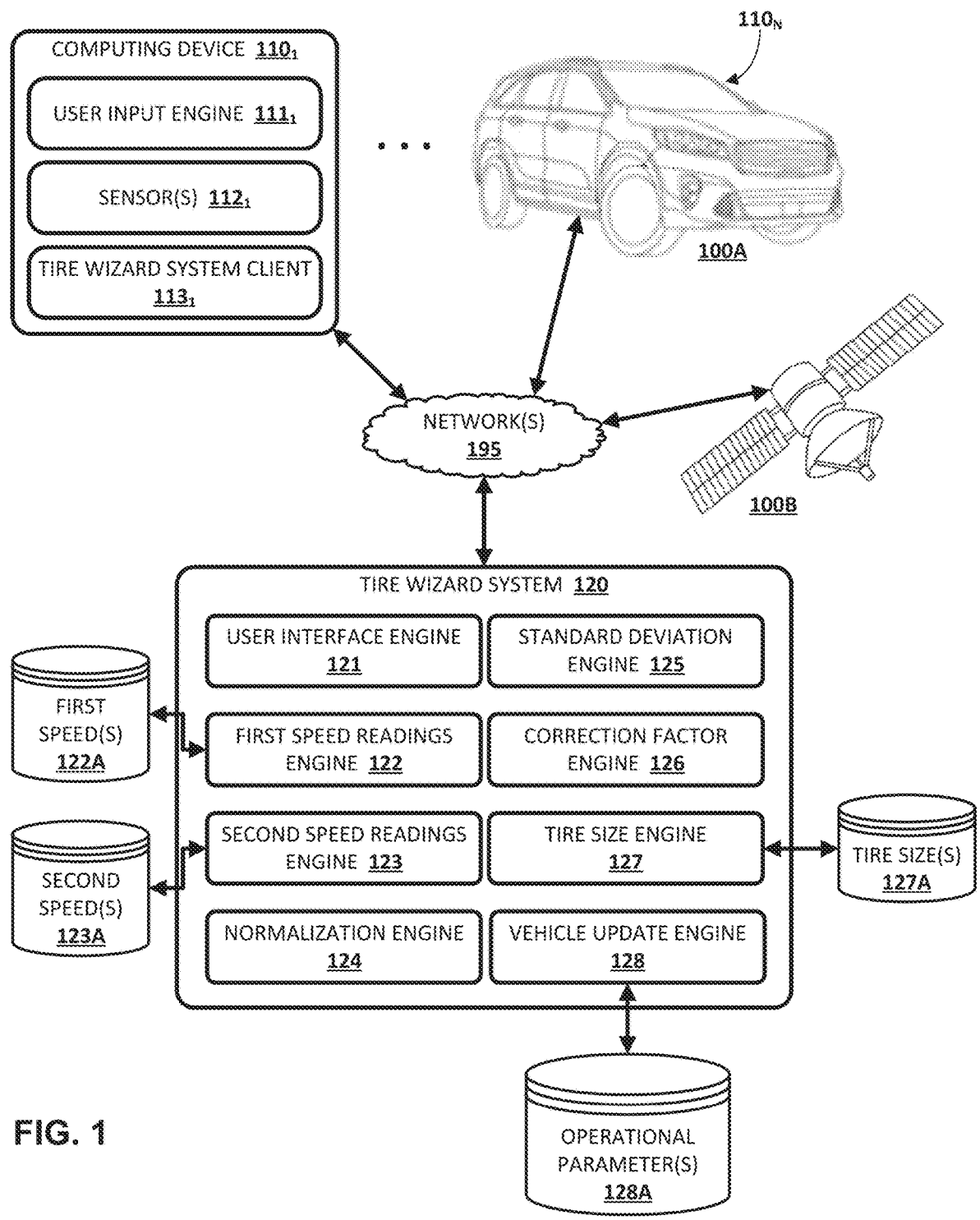
FIG. 1 depicts a block diagram of an example hardware and software environment that demonstrates various aspects of the present disclosure, and in which implementations disclosed herein can be implemented.

Turning now to FIG. 1, an environment in which one or more selected aspects of the present disclosure may be implemented is depicted. The example environment includes a plurality of computing devices $110_{1-N}$, a tire wizard system 120, a vehicle 100A, and a satellite 100B. Each of these components $110_{1-N}$, 120, 100A, and 100B may communicate, for example, through one or more networks 195. The tire wizard system 120 is an example of an information processing and retrieval system in which the systems, components, and techniques described herein may be implemented and/or with which systems, components, and techniques described herein may interface.

In various implementations, an individual (which in the current context may also be referred to as a "user") may operate one or more of the computing devices $110_{1-N}$ to interact with other components depicted in FIG. 1. As noted above, each component depicted in FIG. 1 may be coupled with other components through one or more of the networks 195, such as a local area network ("LAN", including, but not limited to, Bluetooth, Wi-Fi, and/or other LANs), or wide area network ("WAN", including, but not limited to, the Internet and/or other WANs). The computing devices $110_{1-N}$ may be, for example, a desktop computing device, a laptop computing device, a tablet computing device, a mobile phone computing device, a computing device of a vehicle of the participant (e.g., an in-vehicle communications system, an in-vehicle entertainment system, and/or an in-vehicle navigation system as shown with respect to $110_N$), or a wearable apparatus that includes a computing device, such as a head-mounted display ("HMD") that provides an augmented reality ("AR") or virtual reality ("VR") immersive computing experience, a "smart" watch, and so forth. Additional and/or alternative computing devices may be provided.

Each of the computing devices $110_{1-N}$ and the tire wizard system 120 may include one or more memories for storage of data and software applications, one or more processors for accessing data and executing applications, and other components that facilitate communication over one or more of the networks 195. The operations performed by one or more of the computing devices $110_{1-N}$ and/or the tire wizard system 120 may be distributed across multiple computer systems. For example, the tire wizard system 120 may be implemented as, for example, computer programs running exclusively on or distributed across one or more computers in one or more locations that are coupled to each other through one or more of the networks 195.

Each of the computing devices $110_{1-N}$ may operate a variety of different components that may be used, for instance, to automatically determine an updated tire size of tires of a vehicle and influence operation of the vehicle based thereon as described herein. For example, a computing device $110_1$ may include user input engine $111_1$ to detect and process user input (e.g., spoken input, typed input, and/or touch input) directed to the computing device $110_1$. As another example, the computing device $110_1$ may include a plurality of sensors $112_1$ to generate corresponding sensor data. The plurality of sensors can include, for example, global positioning system ("GPS") sensors to generate GPS data based on signals transmitted to and/or received from the satellite 1006, vision components to generate vision data in a field of view of the vision components, microphones to generate audio data based on spoken input captured in an environment of the computing device $110_1$, and/or other sensors to generate corresponding audio data. As yet another example, the computing device $110_1$ may operate a tire wizard system client $113_1$ (e.g., which may be standalone or part of another application, such as part of a web browser) to interact with the tire wizard system 120. Further, an additional computing device $110_N$ may take the form of an in-vehicle computing device of the vehicle 100A. Although not depicted, the additional computing device $110_N$ may include the same or similar components as the computing device $110_1$. For example, the additional computing device $110_N$ may include respective instances of a user input engine to detect and process user input, a plurality of sensors to generate corresponding sensor data, and/or a tire wizard system client to interact with the tire wizard system 120. Moreover, although only the computing device $110_1$ and the additional computing device $110_N$ are depicted in FIG. 1, it should be understood that is for the sake of example and additional or alternative computing devices may be provided.

In various implementations, the tire wizard system 120 may include user interface engine 121, first speed readings engine 122, second speed readings engine 123, normalization engine 124, standard deviation engine 125, correction factor engine 126, tire size engine 127, and vehicle update engine 128 as shown in FIG. 1. In some implementations, one or more of the engines 121-128 of the tire wizard system 120 may be omitted. In some implementations, all or aspects of one or more of the engines 121-128 of the tire wizard system 120 may be combined. In some implementations, one or more of the engines 121-128 of the tire wizard system 120 may be implemented in a component that is separate from the tire wizard system 120. In some implementations, one or more of the engines 121-128 of the tire wizard system 120, or any operative portion thereof, may be implemented in a component that is executed, in part or exclusively, by one or more of the computing devices $110_{1-N}$.

The tire wizard system 120 can be utilized to automatically determine an updated tire size of tires of the vehicle 100A and influence operation of the vehicle 100A based thereon using one or more of the engines 121-128 of the tire wizard system 120 described herein. The user interface engine 121 may be configured to receive data at the tire wizard system 120 from one or more sources (e.g., the computing devices $110_1$-$110_N$, the vehicle 100A, the satellite, and/or other sources), transmit data from the tire wizard system 120 to one or more of the sources, and/or facilitate the exchange of data across the tire wizard system 120.

As described herein, the first speed readings engine 122 can obtain, while a user is driving the vehicle 100A, a stream of first speed readings of the vehicle 100A. The stream of first speed readings can be generated by a speed sensor of a first computing device (e.g., a speed sensor of the additional computing device $110_N$ of the vehicle 100A). As the stream of first speed readings is obtained, one or more first speed readings, included in the stream of first speed readings, can be transiently or non-transiently stored in one or more databases for further processing (e.g., in first speed(s) database 122A). Further, the second speed readings engine 123 can obtain, also while the user is driving the vehicle 100A, a stream of second speed readings of the vehicle 100A. The stream of second speed readings can be generated by a speed sensor of a different second computing device (e.g., a speed sensor or location sensor of the computing device $110_1$ of the vehicle 100A that is located in the vehicle 100A while the user is driving). As the stream of second speed readings is obtained, one or more second speed readings, included in the stream of second speed readings, can be transiently or non-transiently stored in one or more databases for further processing (e.g., in the first speed(s) database 122A or in second speed(s) database 123A as depicted in FIG. 1).

Figure 2:
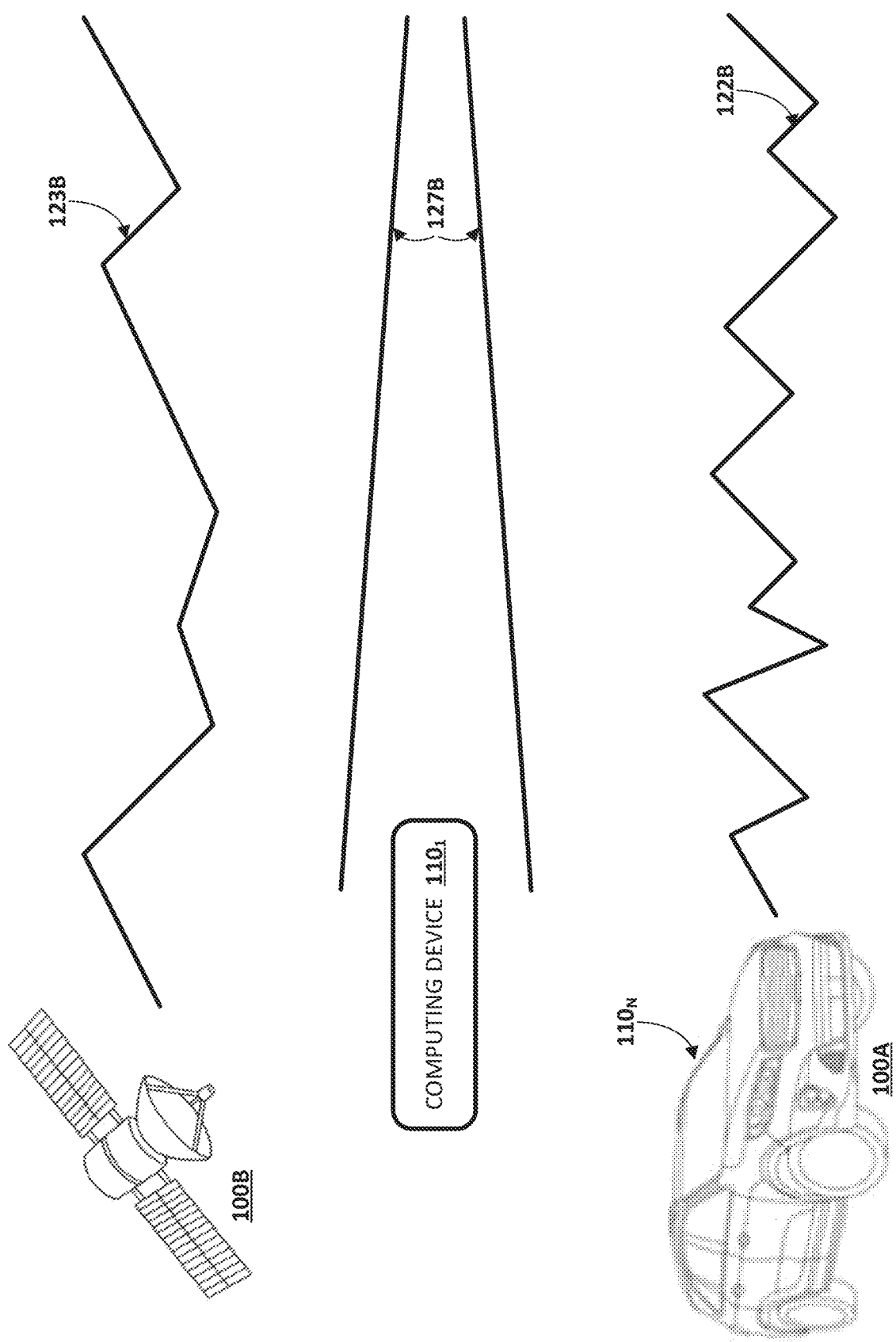
FIG. 2 depicts an example real-world environment that demonstrates various aspects of the present disclosure, and in which implementations disclosed herein can be implemented.

For example, and referring briefly to FIG. 2, assume that the computing device $110_N$ of the vehicle 100A is an in-vehicle computing device of the vehicle 100A and is the first computing device that includes a speed sensor (e.g., a speedometer of the vehicle 100A) for generating the first stream of speed readings. Further assume that the computing device $110_1$ is a mobile computing device of the user (e.g., a smartphone) and the second computing device that includes a speed sensor or location sensor (e.g., in communication with the satellite 100B) for generating the second stream of speed readings. While the user drives the vehicle 100A, the first speed readings engine 122 can obtain the first stream of speed readings as indicated by 122B from the speed sensor of the in-vehicle computing device, and the second speed readings engine 123 can obtain the second stream of speed readings as indicated by 123B from the speed sensor of the in-vehicle computing device (e.g., determined based on location and/or speed data generated by the satellite 100B). Notably, the one or more first speed readings as indicated by 122B, included in the stream of first speed readings may be obtained at a different frequency than the one or more second speed readings as indicated by 123B, included in the stream of second speed readings, as shown by the smaller period of 122B compared to the larger period of 123B. This difference in frequency in obtaining the one or more first speed readings as indicated by 122B and the one or more second speed readings as indicated by 123B may be based on, for example, a type of sensor utilized in generating the different streams of speed readings, an operating system utilized by the different computing devices that generate the different streams of speed readings, latency introduced by obtaining the different streams of speed readings from the different computing devices and/or other factors.

Referring back to FIG. 1, the normalization engine 124 can normalize the one or more first speed readings, included in the stream of first speed readings, and the one or more second speed readings, included in the stream of second speed readings. For example, the normalization engine 124 can obtain the one or more first speed readings from the first speed(s) database 122A and average the one or more first speed readings over a duration of time. Further, the normalization engine 124 can obtain the one or more second speed readings from the second speed(s) database 123A and average the one or more second speed readings over the duration of time. Additionally, or alternatively, the normalization engine 124 can average the one or more first speed readings and/or the one or more second speed readings as they are obtained by the first speed readings engine 122 and the second speed readings engine 123, respectively. By normalizing the one or more first speed readings and/or the one or more second speed readings over the duration of time, the effect of the first speed readings and the second speed readings being received at different frequencies can be minimized and computational resources in further processing of the different streams of speed readings can be reduced. For example, the normalization engine 124 can average the amplitudes of the one or more first speed readings as indicated by 122B and the one or more second speed readings as indicated by 123B as shown in FIG. 2 to generate the corresponding normalized streams of speed readings that can be further updated as additional speed readings are obtained.

Referring back to FIG. 1, the standard deviation engine 125 can determine a standard deviation between the one or more normalized first speed readings and the one or more normalized second speed readings. In some implementations, the standard deviation engine 125 may only determine the standard deviation between the one or more normalized first speed readings and the one or more normalized second speed readings in response to determining one or more conditions are satisfied (e.g., as described with respect to FIGS. 3 and 4). In additional or alternative implementations, the standard deviation engine 125 may only determine the standard deviation between the one or more normalized first speed readings and the one or more normalized second speed readings in response to the normalization engine 124 normalizing the one or more first speed readings and the one or more second speed readings and without determining whether any conditions are satisfied. Further, the standard deviation engine 125 can compare the standard deviation to a threshold. This enables the standard deviation engine 125 to provide confirmation (e.g., to the correction factor engine 126 and/or other engines of the tire wizard system 120) that value(s) associated with the one or more normalized first speed readings and the one or more normalized second speed readings that are acceptable for generating a correction factor for the vehicle 100A (e.g., as described with respect to the correction factor engine 126).

In some implementations, and in response to determining that the standard deviation fails to satisfy the threshold, the standard deviation engine 125 can generate one or more signals to modify the normalization process performed by the normalization engine 124 and/or can modify the threshold to which the standard deviation was compared. For instance, the standard deviation engine 125 can generate one or more signals that indicate the duration of time utilized in normalizing the different streams of speed readings should be reduced, thereby effectively reducing a duration of time that the user should drive the vehicle 100A at a steady speed in automatically determining the updated tire size of the tires of the vehicle 100A (e.g., as described with respect to FIG. 4). Also, for instance, the standard deviation engine 125 can modify the threshold to which a subsequent standard deviation determination is compared to allow for more variance in the value(s) associated with the one or more normalized first speed readings and the one or more normalized second speed readings that are acceptable for generating a correction factor for the vehicle 100A. Put another way, if the standard deviation engine 125 initially determines that standard deviation fails to satisfy the threshold, then the standard deviation engine 125 can allow for less precise processing of the different streams of speed readings to prioritize reducing computational resources consumed by the tire wizard system 120.

The correction factor engine 126 can generate a correction factor for the vehicle 100A. The correction factor for the vehicle 100A can be generated based on, for example, comparing the one or more normalized first speed readings to the one or more of the normalized second speed readings. The correction factor for the vehicle 100A may be a ratio or fraction that represents a difference between a previous tire size of the tires of the vehicle 100A and an updated tire size of the tires of the vehicle 100A and that is indirectly determined based on comparing one or more of the normalized first speed readings with one or more of the normalized second speed readings. In some implementations, the correction factor engine 126 may generate the correction factor in response to determining that the standard deviation satisfies a threshold. For example, and referring briefly to FIG. 2, further assume that the one or more normalized first speed readings indicate that the vehicle 100A is incorrectly traveling at 35 MPH. However, also assume that the one or more normalized second speed readings indicate that the vehicle 100A is correctly traveling at 38 MPH. As described herein, the one or more normalized first speed readings indicate that the vehicle 100A is incorrectly traveling at 35 MPH based on the updated tire size of the tires of the vehicle 100A and since the user has not calibrated one or more operational parameters of the vehicle 100A (e.g., the speedometer) based on the updated tire size. Accordingly, the correction factor as indicated by 127B seeks to compensate for the difference between the one or more normalized first speed readings that correspond to an incorrect speed of the vehicle 100A (e.g., 35 MPH) based on the one or more normalized second speed readings that correspond to a correct speed of the vehicle 100A (e.g., 38 MPH).

Referring back to FIG. 1, the tire size engine 127 can determine the updated tire size of the tires of the vehicle 100A based on the correction factor generated by the correction factor engine 126 and based on a previous tire size of previous tires of the vehicle 100A. For example, the tire size engine 127 can multiply the previous tire size of the tires of the vehicle 100A by the correction factor to determine the updated tire size of the tires of the vehicle 100A. In some implementations, the previous tire size of the tires of the vehicle may be readable from one or more databases associated with the vehicle 100A (e.g., from tire size(s) database 127A). In additional or alternative implementations, the user may provide user input (e.g., spoken input, typed input, touch input, or other input) that includes an indication of the previous tire size of the tires of the vehicle. In additional or alternative implementations, the tire size engine 127 can generate and transmit a request to the in-vehicle computing device of the vehicle 100A to obtain the previous tire size of the tires of the vehicle.

The vehicle update engine 128 can generate and transmit one or more structured requests to the in-vehicle computing device of the vehicle 100A. The one or more structured requests can include, for example, an indication of the updated tire size of the tires of the vehicle 100A and one or more operational parameters to be updated based on the updated tire size of the tires of the vehicle 100A. Accordingly, when the user subsequently drives the vehicle 100A, the one or more operational parameters of the vehicle 100A can accurately reflect operation of the vehicle 100A.

Although the examples described above with respect to FIGS. 1 and 2 are generally described with respect to particular computing devices generating particular streams of speed readings and with respect the operations of the tire wizard system 120 being performed remote from the computing devices 110₁-110ₙ, it should be understood that is for the sake of example and is not meant to be limiting. For example, it should be understood that any computing device capable of determining speed (e.g., directly based on speed sensor data generated by a speed sensor or indirectly based on location data over a duration of time generated by a location sensor) can be utilized to perform the techniques described herein. Moreover, it should be understood that the tire wizard system 120 may be implemented locally at one of the computing devices 110₁-110ₙ, remotely from the computing devices 110₁-110ₙ, or at both in a distributed manner.

Figure 3:
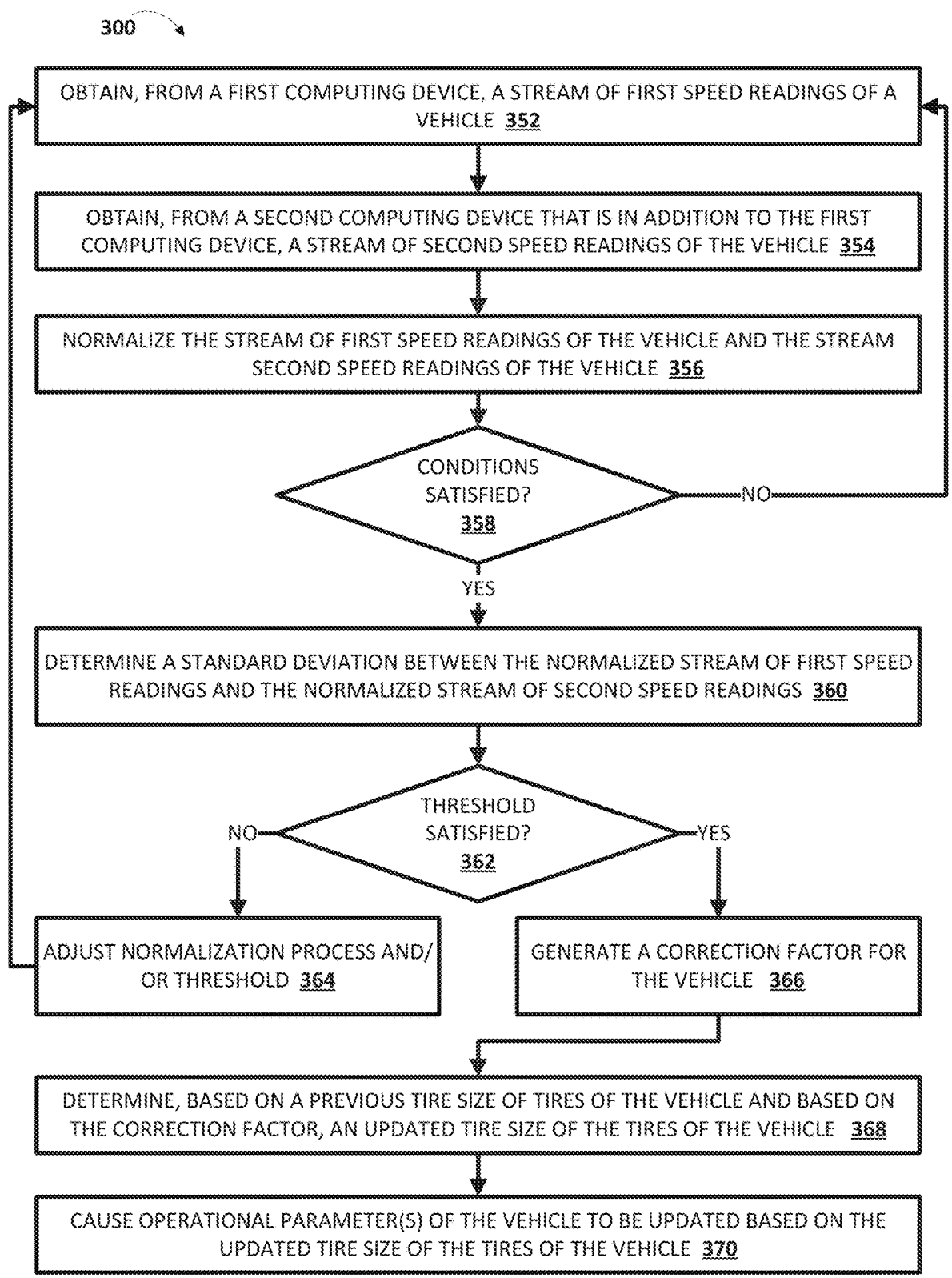
FIG. 3 depicts a flowchart illustrating an example method of automatically determining an updated tire size of tires of a vehicle and influencing operation of the vehicle based thereon, in accordance with various implementations.

Turning now to FIG. 3, a flowchart illustrating an example method 300 of automatically determining an updated tire size of tires of a vehicle and influencing operation of the vehicle based thereon is depicted. For convenience, the operations of the method 300 are described with reference to a system that performs the operations. This system of the method 300 includes at least one processor, at least one memory, and/or other component(s) of computing device(s) (e.g., computing device(s) 110₁₋ₙ of FIG. 1, tire wizard system 120 of FIG. 1, computing device 510 of FIG. 5, remote server(s), and/or other computing devices).

At block 352, the system obtains, from a first computing device, a stream of first speed readings of a vehicle. The first computing device can be, for example, an in-vehicle computing device of the vehicle. Further, the stream of first speed readings can correspond to a stream of vehicle speed readings generated by a vehicle speed sensor of the vehicle. For instance, the stream of first speed readings can be generated by a speedometer of the vehicle and obtained from the system via a controller area network (CAN) bus or other data port of the vehicle. At block 354, the system obtains, from a second computing device that is in addition to the first computing device, a stream of second speed readings of the vehicle. The second computing device can be, for example, a mobile computing device of a user of the vehicle. Further, the stream of second speed readings can correspond to a stream of mobile speed readings generated by a mobile speed sensor of the mobile computing device of the user. For instance, the stream of second speed readings can be generated by a dedicated speed sensor of the mobile computing device and/or generated based on a location readings generated by a location sensor of the mobile computing device over a duration of time.

Put another way, the system obtains streams of speed readings of the vehicle from two different sources—the different computing devices. Notably, one of the streams of speed readings reflect an actual speed of the vehicle, such as the stream of second speed readings in the example above that is generated by the dedicated speed sensor of the mobile computing device and/or generated based on the location readings generated by the location sensor of the mobile computing device over the duration of time. This stream of speed readings reflects the actual speed of the vehicle in that these speed readings are unaffected based on the unknown updated tire size of tires of the vehicle that is yet to be determined and that is yet to be utilized to update operational parameter(s) of the vehicle. In contrast, another one of the streams of speed readings reflect an incorrect speed of the vehicle, such as the stream of first speed readings in the example above that is generated by the vehicle speed sensor of the vehicle. This stream of speed readings reflects the incorrect speed of the vehicle in that these speed readings are affected based on the unknown updated tire size of tires of the vehicle.

At block 356, the system normalizes the stream of first speed readings obtained at block 352 and the stream of second speed readings obtained at block 354. Notably, first speed readings, included in the stream of first speed readings, and second speed readings, included in the stream of second speed readings, may be obtained at a different frequency as a function of the first speed readings and the second speed readings being generated by different sensors of different computing devices. Accordingly, the system can normalize the stream of first speed readings by averaging the first speed readings over a duration of time, identifying a mean, median, or mode of the first speed readings over the duration of time, and/or perform other operations to normalize the stream of first speed readings. Further, the system can normalize the stream of second speed readings by averaging the second speed readings over the duration of time, identifying a mean, median, or mode of the first speed readings over the duration of time, and/or perform other operations to normalize the stream of second speed readings.

At block 358, the system determines whether one or more conditions are satisfied for determining a standard deviation between the normalized stream of first speed readings and the normalized stream of second speed readings. The one or more conditions can include, for example, whether the normalized stream of first speed readings is stable for a threshold quantity of first speed readings, whether the normalized stream of first speed readings is stable for a threshold duration of time, and/or other conditions. For example, the system can determine the one or more conditions are satisfied in response to the normalized stream of first speed readings being stable at 35 MPH for 30 seconds (or another duration of time) and/or 100 speed readings (or another quantity of speed readings). Notably, although the first speed readings may indicate stability at 35 MPH for 30 seconds and/or 100 speed readings in this example, the normalized stream of second speed readings may differ (e.g., stable at 38 MPH which may be the actual speed of the vehicle) since one of the streams of speed readings is incorrect due to the updated tire size of the tires of the vehicle that is yet to be determined and that is yet to be utilized to update the operational parameter(s) of the vehicle.

If, at an iteration of block 358, the system determines that the one or more conditions are not satisfied, then the system returns to block 352 and proceeds with an additional iteration of the operations of blocks 352-358. The system may continue with additional iterations of the operations of blocks 352-358 until the one or more conditions are satisfied. Notably, while the system determines whether the one or more conditions are satisfied, the system may perform additional iterations of the operations of blocks 352-358, in parallel, to determine when the one or more conditions are satisfied. If, at an iteration of block 358, the system determines that the one or more conditions are satisfied, then the system proceeds to block 360.

At block 360, the system determines a standard deviation between the normalized stream of first speed readings and the normalized stream of second speed readings. For instance, the system can calculate the standard deviation between one or more normalized first speed readings, included in the normalized stream of first speed readings, to one or more normalized second speed readings, included in the normalized stream of second speed readings. At block 362, the system determines whether the standard deviation between the normalized stream of first speed readings and the normalized stream of second speed readings satisfies a threshold. Put another way, the system can compare the standard deviation between the normalized stream of first speed readings and the normalized stream of second speed readings to the threshold to ensure that the one or more normalized first speed readings and the one or more normalized second speed readings are acceptable values to be utilized in subsequently generating the correction factor as described herein.

If, at an iteration of block 362, the system determines that the standard deviation does not satisfy the threshold, then the system proceeds to block 364. At block 364, the system adjusts the normalization process of the operations of block 356 and/or adjusts the threshold utilized by the operations of block 362. For example, the system can adjust the normalization process by adjusting the duration of time over which the streams of speed of speed readings are normalized and/or by otherwise adjusting the normalization process. Additionally, or alternatively, the system can adjust the threshold with which the standard deviation is compared. Put another way, the system can adjust the normalization process of the operations of block 356 and/or adjusts the threshold utilized by the operations of block 362 in an effort to conserve computational resources while balancing accuracy of the updated tire size of the tire size of the vehicle determined using the method 300 of FIG. 3. Further, the system returns to block 352 and proceeds with an additional iteration of the operations of blocks 352-362. The system may continue with additional iterations of the operations of blocks 352-362 until the threshold is satisfied. Notably, while the system determines whether the threshold is satisfied, the system may perform additional iterations of the operations of blocks 352-362, in parallel, to determine when the threshold is satisfied.

If, at an iteration of block 362, the system determines that the threshold is satisfied, then the system proceeds to block 366. At block 366, the system generates a correction factor for the vehicle. The correction factor for the vehicle can be generated based on, for example, comparing one or more of the normalized first speed readings, included in the normalized stream of first speed readings, to one or more of the normalized second speed readings, included in the normalized stream of second speed readings. The correction factor for the vehicle may be a ratio or fraction that represents a difference between a previous tire size of the tires of the vehicle and an updated tire size of the tires of the vehicle and that is indirectly determined based on comparing one or more of the normalized first speed readings with one or more of the normalized second speed readings.

At block 368, the system determines, based on a previous tire size of tires of the vehicle and based on the correction factor, an updated tire size of the tires of the vehicle. For example, the system can determine the updated tire size of the tires of the vehicle by multiplying the previous tire size by the ratio or fraction corresponding to the correction factor to determine the updated tire size of the tires of the vehicle.

At block 370, the system causes one or more operational parameters of the vehicle to be updated based on the updated tire size of the tires of the vehicle. For example, the system can generate one or more structured requests that include at least an indication of the updated tire size of the tires of the vehicle, and transmit the one or more structured requests to an in-vehicle computing device of the vehicle. In response to receiving the one or more structure requests, the in-vehicle computing device of the vehicle can cause one or more of the operational parameters of the vehicle to be updated. Accordingly, when the user subsequently drives the vehicle, one or more of the operational parameters should be correct. For instance, from the above example where the first speed readings indicate that the vehicle is traveling at 35 MPH (and assuming that the vehicle is, in fact, traveling at 35 MPH), the second speed readings should now also indicate that the vehicle is traveling at 35 MPH.

While operations of the method 300 are shown in a particular order, this is not meant to be limiting. One or more operations may be reordered, omitted, and/or added. For example, in various implementations, one or more of the operations of blocks 358 or 362 may be omitted. Also, for example, in various implementations, additional blocks corresponding to the operations of block 362 may be included throughout the method 300 of FIG. 3. Accordingly, it should be understood that the method 300 of FIG. 3 is provided for the sake of example and is not meant to be limiting.

Figure 4:
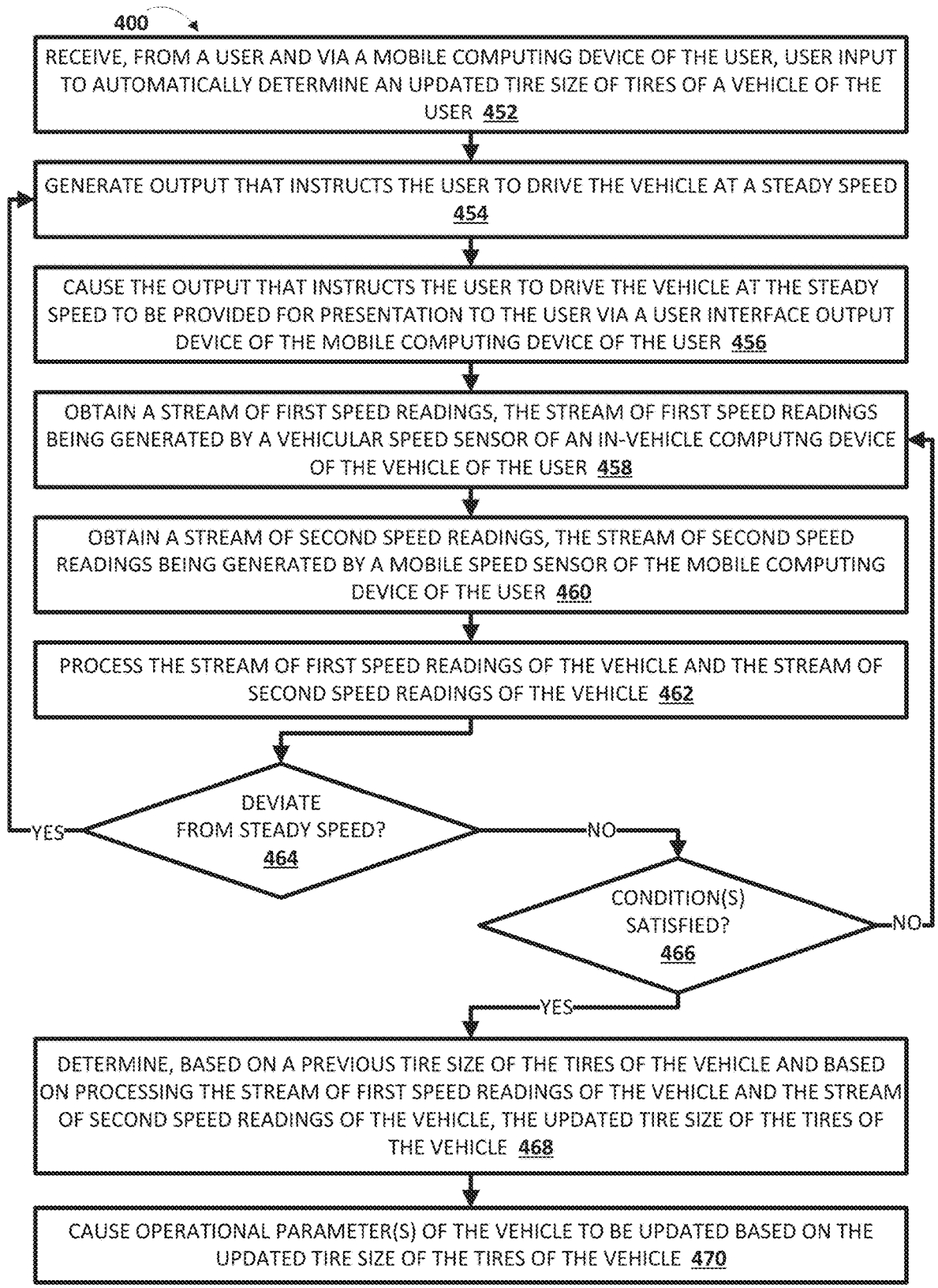
FIG. 4 depicts a flowchart illustrating another example method of automatically determining an updated tire size of tires of a vehicle and influencing operation of the vehicle based thereon, in accordance with various implementations.

Turning now to FIG. 4, a flowchart illustrating another example method 400 of automatically determining an updated tire size of tires of a vehicle and influencing operation of the vehicle based thereon is depicted. For convenience, the operations of the method 400 are described with reference to a system that performs the operations. This system of the method 400 includes at least one processor, at least one memory, and/or other component(s) of computing device(s) (e.g., computing device(s) $110_{1-N}$ of FIG. 1, tire wizard system 120 of FIG. 1, computing device 510 of FIG. 5, remote server(s), and/or other computing devices).

At block 452, the system receives, from a user and via a mobile computing device of the user, user input to automatically determine an updated tire size of tires of a vehicle of the user. For example, the user can direct the user input to a software application accessible at the mobile computing device of the user and that is associated with automatically determining the updated tire size of the tires of the vehicle. The software application can be a standalone software application or as part of another software application that includes additional functionalities.

At block 454, the system generates output that instructs the user to drive the vehicle at a steady speed. At block 456, the system causes the output that instructs the user to drive the vehicle at the steady speed to be provided for presentation to the user via a user interface output device of the mobile computing device of the user. As used herein, steady speed may refer to any speed that is constant or near constant (including minor deviations) over a distance, but may or may not correspond to a particular speed since the steady speed may be restricted based on speed limits of municipalities. In some implementations, the output can be provided for audible presentation and/or visual presentation to the user via the mobile computing device and/or via an in-vehicle computing device of the vehicle. In additional or alternative implementations, the output can be provided as a series of audible cues to minimize distracting the user while driving.

At block 458, the system obtains a stream of first speed readings, the stream of first speed readings being generated by a vehicular speed sensor of an in-vehicle computing device of the vehicle of the user. For instance, the stream of first speed readings can be generated by a speedometer of the vehicle and obtained from the system via a controller area network (CAN) bus or other data port of the vehicle. At block 460, the system obtains a stream of second speed readings, the stream of second speed readings being generated by a mobile speed sensor of the mobile computing device of the user. For instance, the stream of second speed readings can be generated by a dedicated speed sensor of the mobile computing device and/or generated based on a location readings generated by a location sensor of the mobile computing device over a duration of time.

At block 462, the system processes the stream of first speed readings of the vehicle and the stream of second speed readings of the vehicle. At block 464, the system determines whether a current speed of the vehicle deviates from the steady speed of the vehicle. Notably, in various implementations, the system may allow for some deviation from the steady speed (e.g., +/−0.5 MPH). In some implementations, the system can analyze the stream of first speed readings of the vehicle and the stream of second speed readings of the vehicle to determine whether the current speed of the vehicle deviates from the steady speed of the vehicle. In additional or alternative implementations, the system can normalize the stream of first speed readings of the vehicle and normalize the stream of second speed readings of the vehicle as described with respect to the operations of block 356 of the method 300 of FIG. 3. In these implementations, the system can analyze the normalized stream of first speed readings of the vehicle and the normalized stream of second speed readings of the vehicle to determine whether the current speed of the vehicle deviates from the steady speed of the vehicle. In additional or alternative versions of those implementations, the system can determine a standard deviation between the normalized stream of first speed readings and the normalized stream of second speed readings as described with respect to the operations of block 360 of the method 300 of FIG. 3. In additional or alternative versions of those implementations, the system can generate a correction factor for the vehicle as described with respect to the operations of block 366 of the method 300 of FIG. 3.

If, at an iteration of block 464, the system determines that the current speed of the vehicle deviates from the steady speed of the vehicle, then the system returns to block 454 to generate additional output that instructs the user to drive the vehicle at the steady speed and the additional output can be provided for presentation to the user at a subsequent iteration of block 456. The system may continue with additional iterations of the operations of blocks 452-464 to ensure that the user drives the vehicle at the steady speed. If, at an iteration of block 464, the system determines that the current speed of the vehicle does not deviate from the steady speed of the vehicle, then the system proceeds to block 466.

At block 466, the system determines whether one or more conditions are satisfied for further processing the stream of first speed readings and the stream of second speed readings. The one or more conditions can include, for example, whether the stream of first speed readings (e.g., normalized or non-normalized) is stable for a threshold quantity of first speed readings (e.g., as described with respect to the operations of block 358 of the method 300 of FIG. 3), whether the stream of first speed readings (e.g., normalized or non-normalized) is stable for a threshold duration of time (e.g., as described with respect to the operations of block 358 of the method 300 of FIG. 3), whether a standard deviation between the first stream of speed readings (e.g., normalized or non-normalized) and the second stream of speed readings (e.g., normalized or non-normalized) satisfies a threshold (e.g., as described with respect to the operations of block 362 of the method 300 of FIG. 3), and/or other conditions.

If, at an iteration of block 466, the system determines that the one or more conditions are not satisfied, then the system returns to block 458 and proceeds with an additional iteration of the operations of blocks 458-466. The system may continue with additional iterations of the operations of blocks 458-466 until the one or more conditions are satisfied. Notably, while the system determines whether the one or more conditions are satisfied, the system may perform additional iterations of the operations of blocks 458-466, in parallel, to determine when the one or more conditions are satisfied.

If, at an iteration of block 466, the system determines that the one or more conditions are satisfied, then the system proceeds to block 468. At block 468, the system determines, based on a previous tire size of the tires of the vehicle and based on processing the stream of first speed readings of the vehicle and the stream of second speed readings of the vehicle (e.g., based on a correction factor determined based on processing the stream of first speed readings of the vehicle and the stream of second speed readings of the vehicle), the updated tire size of the tires of the vehicle. For example, the system can determine the updated tire size of the tires of the vehicle by multiplying the previous tire size by a ratio or fraction corresponding to the correction factor to determine the updated tire size of the tires of the vehicle. In some implementations, the system may not generate the correction factor until the system determines the one or more conditions are satisfied at block 466.

At block 470, the system causes one or more operational parameters of the vehicle to be updated based on the updated tire size of the tires of the vehicle. For example, the system can generate one or more structured requests that include at least an indication of the updated tire size of the tires of the vehicle, and transmit the one or more structured requests to an in-vehicle computing device of the vehicle. In response to receiving the one or more structure requests, the in-vehicle computing device of the vehicle can cause one or more of the operational parameters of the vehicle to be updated. Accordingly, when the user subsequently drives the vehicle, one or more of the operational parameters should be correct. For instance, from the above example where the first speed readings indicate that the vehicle is traveling at 35 MPH (and assuming that the vehicle is, in fact, traveling at 35 MPH), the second speed readings should now also indicate that the vehicle is traveling at 35 MPH.

While operations of the method 400 are shown in a particular order, this is not meant to be limiting. One or more operations may be reordered, omitted, and/or added. For example, in various implementations, additional blocks corresponding to the operations of block 466 may be included throughout the method 300 of FIG. 3, such as after each other block of the method 400 of FIG. 4. Accordingly, it should be understood that the method 400 of FIG. 4 is provided for the sake of example and is not meant to be limiting.

Figure 5:
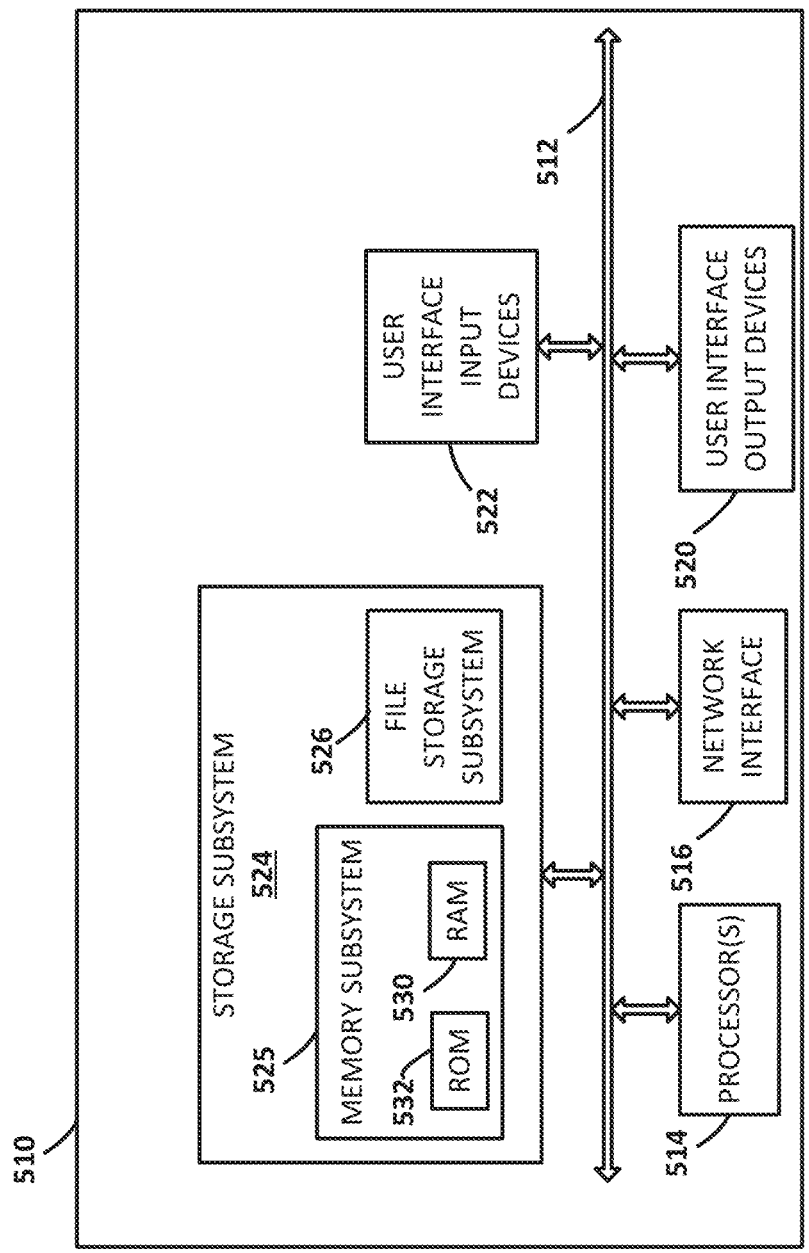
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more computing devices, one or more vehicles, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes obtaining, from a first computing device, a stream of first speed readings of a vehicle, the stream of first speed readings being generated by a first speed sensor of the first computing device; obtaining, from a second computing device, a stream of second speed readings of the vehicle, the stream of second speed readings being generated by a second speed sensor of the second computing device; normalizing the stream of first speed readings the stream of second speed readings; determining, based on the normalized stream of first speed readings and the normalized stream of second speed readings, a standard deviation between the normalized stream of first speed readings and the normalized stream of second speed readings; determining whether the standard deviation between the normalized stream of first speed readings and the normalized stream of second speed readings satisfies a threshold; in response to determining the standard deviation between the normalized stream of first speed readings and the normalized stream of second speed readings satisfies the threshold: generating, based on the normalized stream of first speed readings and the normalized stream of second speed readings, a correction factor for the vehicle; and determining, based on a previous tire size of tires of the vehicle and the correction factor, an updated tire size of the tires of the vehicle; and causing one or more operational parameters of the vehicle to be updated based on the updated tire size of the tires of the vehicle.

These and other implementations of technology disclosed herein can optionally include one or more of the following features.

In some implementations, normalizing the stream of first speed readings the stream of second speed readings may include averaging one or more first speed readings, included in the stream of first speed readings, across a duration of time to generate the normalized stream of first speed readings; and averaging one or more second speed readings, included in the stream of second speed readings, across the duration of time to generate the normalized stream of second speed readings.

In some versions of those implementations, the method may further include, in response to determining the standard deviation between the normalized stream of first speed readings and the normalized stream of second speed readings does not satisfy the threshold: obtaining an additional duration of time to be utilized in normalizing the stream of first speed readings the stream of second speed readings, the additional duration of time being in addition to the duration of time; and further normalizing the stream of first speed readings the stream of second speed readings. Further normalizing the stream of first speed readings the stream of second speed readings may include averaging one or more additional first speed readings, included in the stream of first speed readings, across the additional duration of time to generate the normalized stream of first speed readings; and averaging one or more additional second speed readings, included in the stream of second speed readings, across the additional duration of time to generate the normalized stream of second speed readings. The method may further include determining, based on the further normalized stream of first speed readings and the further normalized stream of second speed readings, an additional standard deviation between the further normalized stream of first speed readings and the further normalized stream of second speed readings.

In some further versions of those implementations, the method may further include, in response to determining the additional standard deviation between the normalized stream of first speed readings and the normalized stream of second speed readings does not satisfy the threshold: obtaining a further additional duration of time to be utilized in normalizing the stream of first speed readings the stream of second speed readings, the further additional duration of time being in addition to the duration of time and being in addition to the additional duration of time.

In some implementations, the method may further include, in response to determining the standard deviation between the normalized stream of first speed readings and the normalized stream of second speed readings does not satisfy the threshold: obtaining an additional threshold, the additional threshold being in addition to the threshold; further normalizing the stream of first speed readings the stream of second speed readings; determining, based on the further normalized stream of first speed readings and the further normalized stream of second speed readings, an additional standard deviation between the further normalized stream of first speed readings and the further normalized stream of second speed readings; determining whether the additional standard deviation between the further normalized stream of first speed readings and the further normalized stream of second speed readings satisfies the additional threshold; and in response to determining the additional standard deviation between the further normalized stream of first speed readings and the further normalized stream of second speed readings satisfies the additional threshold: generating, based on the further normalized stream of first speed readings and the further normalized stream of second speed readings, the correction factor for the vehicle; and determining, based on the previous tire size of the tires of the vehicle and the correction factor, an updated tire size of the tires of the vehicle.

In some versions of those implementations, the method may further include, in response to determining the additional standard deviation between the further normalized stream of first speed readings and the further normalized stream of second speed readings does not satisfy the additional threshold: obtaining a further additional threshold, the further additional threshold being in addition to the threshold and being in addition to the additional threshold.

In some implementations, each first speed reading, included in the stream of first speed readings, may be obtained at a first frequency, and each second speed reading, included in the stream of second speed readings, may be obtained a second frequency that is different from the first frequency.

In some implementations, determining the standard deviation between the stream of first speed readings and the stream of second speed readings may be in response to determining one or more conditions are satisfied. In some versions of those implementations, the one or more conditions may include one or more of: determining the stream of first speed readings is stable for a threshold quantity of first speed readings, or determining the stream of first speed readings is stable for a threshold duration of time.

In some implementations, determining the standard deviation between the normalized stream of first speed readings and the normalized stream of second speed readings may include comparing one or more normalized first speed readings, from the normalized stream of first speed readings, to one or more normalized second speed readings, from the normalized stream of second speed readings, to determine the standard deviation.

In some implementations, generating the correction factor for the vehicle based on the normalized stream of first speed readings and the normalized stream of second speed readings may include calculating a ratio based on one or more normalized first speed readings, from the normalized stream of first speed readings, to one or more normalized second speed readings, from the normalized stream of second speed readings; and utilizing the ratio as the correction factor for the vehicle. In some versions of those implementations, the method may further include obtaining the previous tire size of tires of the vehicle. The previous tire size of the tires of the vehicle may be obtained from the vehicle or from a user of the vehicle. The method may further include determining, based on the ratio and based on the previous tire size of the tires of the tires of the vehicle, the updated tire size of the tires of the vehicle. In some further versions of those implementations, causing one or more of the operational parameters of the vehicle to be updated based on the updated tire size of the tires of the vehicle may include generating a tire size signal that includes an indication of the updated tire size of the tires of the vehicle; and causing the vehicle to update one or more of the operational parameters of the vehicle based on the updated tire size of the tires of the vehicle. The one or more operational parameters may include one or more of: a speedometer calibration parameter, a transmission calibration parameter, a transfer case gearing parameter, an axle gearing parameter, or an anti-lock brake system (ABS) parameter.

In some implementations, the first computing device may be an in-vehicle computing device of the vehicle, and the first speed sensor of the first computing device may be a vehicle speed sensor of the in-vehicle computing device of the vehicle. Further, the second computing device may be a mobile computing device of a user of the vehicle, and the second speed sensor of the second computing device may be a global positioning system (GPS) sensor of the mobile computing device of the user of the vehicle. In some versions of those implementations, the one or more processors may be local to the mobile computing device of the user of the vehicle, the one or more processors may be local to the in-vehicle computing device of the vehicle, or the one or more processors may be remote from both the mobile computing device of the user of the vehicle and the in-vehicle computing device of the vehicle.

In some implementations, a method implemented by one or more processors is provided, and includes receiving, from a user, user input to automatically determine an updated tire size of tires of a vehicle of the user; in response to receiving the user input: generating output that instructs the user to drive the vehicle at a steady speed; and causing the output that instructs the user to drive the vehicle at the steady speed to be provided for presentation to the user via a user interface output device of a mobile computing device of the user or an in-vehicle computing device of the vehicle of the user; while the user is driving the vehicle: obtaining a stream of first speed readings of the vehicle, the stream of first speed readings being generated by a vehicular speed sensor of the in-vehicle computing device of the vehicle; obtaining a stream of second speed readings of the vehicle, the stream of second speed readings being generated by a mobile speed sensor of the mobile computing device; processing the stream of first speed readings of the vehicle and the stream of second speed readings of the vehicle; and determining, based on a previous tire size of tires of the vehicle and based on processing the stream of first speed readings of the vehicle and the stream of second speed readings of the vehicle, the updated tire size of the tires of the vehicle; and causing one or more operational parameters of the vehicle to be updated based on the updated tire size of the tires of the vehicle.

These and other implementations of technology disclosed herein can optionally include one or more of the following features.

In some implementations, the method may further include, while the user is driving the vehicle: determining whether the user is driving the vehicle at the steady speed; and in response to determining that the user is not driving the vehicle at the steady speed: generating additional output that instructs the user to drive the vehicle at the steady speed; and causing the additional output that instructs the user to drive the vehicle at the steady speed to be provided for presentation to the user via the user interface output device of the mobile computing device of the user or the in-vehicle computing device of the vehicle of the user.

In some implementations, the method may further include, in response to determining the updated tire size of the tires of the vehicle based on processing the stream of first speed readings of the vehicle and the stream of second speed readings of the vehicle: causing an indication of the updated tire size of the tires of the vehicle to be provided for presentation to the user via the user interface output device of the mobile computing device of the user or the in-vehicle computing device of the vehicle of the user.

In some implementations, processing the stream of first speed readings of the vehicle and the stream of second speed readings of the vehicle may include normalizing the stream of first speed readings the stream of second speed readings; determining, based on the normalized stream of first speed readings and the normalized stream of second speed readings, a standard deviation between the stream of first speed readings and the stream of second speed readings; determining whether the standard deviation between the normalized stream of first speed readings and the normalized stream of second speed readings satisfies a threshold; and in response to determining the standard deviation between the normalized stream of first speed readings and the normalized stream of second speed readings satisfies the threshold, generating, based on the normalized stream of first speed readings and the normalized stream of second speed readings, a correction factor for the vehicle. Determining the updated tire size of the tires of the vehicle may be based on the previous tire size of tires of the vehicle and based on the correction factor for the vehicle.

In some implementations, a mobile computing device is provided and includes at least one processor; and memory storing instructions that, when executed, cause the at least one processor to: obtain a stream of first speed readings of a vehicle, the stream of first speed readings being generated by a vehicular speed sensor of an in-vehicle computing device of the vehicle, the in-vehicle computing device being in communication with the mobile computing device; obtain a stream of second speed readings of the vehicle, the stream of second speed readings being generated by a mobile speed sensor of the mobile computing device; normalize the stream of first speed readings the stream of second speed readings; determine, based on the normalized stream of first speed readings and the normalized stream of second speed readings, a standard deviation between the normalized stream of first speed readings and the normalized stream of second speed readings; determine whether the standard deviation between the normalized stream of first speed readings and the normalized stream of second speed readings satisfies a threshold; in response to determining the standard deviation between the normalized stream of first speed readings and the normalized stream of second speed readings satisfies the threshold: generate, based on the normalized stream of first speed readings and the normalized stream of second speed readings, a correction factor for the vehicle; and determine, based on a previous tire size of tires of the vehicle and the correction factor, an updated tire size of the tires of the vehicle; and cause one or more operational parameters of the vehicle to be updated based on the updated tire size of the tires of the vehicle.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
    obtaining, from a first computing device, a stream of first speed readings of a vehicle, the stream of first speed readings being generated by a first speed sensor of the first computing device;
    obtaining, from a second computing device, a stream of second speed readings of the vehicle, the stream of second speed readings being generated by a second speed sensor of the second computing device;
    normalizing the stream of first speed readings and the stream of second speed readings;
    determining, based on the normalized stream of first speed readings and the normalized stream of second speed readings, a standard deviation between the normalized stream of first speed readings and the normalized stream of second speed readings;
    determining whether the standard deviation between the normalized stream of first speed readings and the normalized stream of second speed readings satisfies a threshold;
    in response to determining the standard deviation between the normalized stream of first speed readings and the normalized stream of second speed readings satisfies the threshold:
        generating, based on the normalized stream of first speed readings and the normalized stream of second speed readings, a correction factor for the vehicle; and
        determining, based on a previous tire size of tires of the vehicle and the correction factor, an updated tire size of the tires of the vehicle; and
    causing one or more operational parameters of the vehicle to be updated based on the updated tire size of the tires of the vehicle.

2. The method of claim 1, wherein normalizing the stream of first speed readings and the stream of second speed readings comprises:
    averaging one or more first speed readings, included in the stream of first speed readings, across a duration of time to generate the normalized stream of first speed readings; and
    averaging one or more second speed readings, included in the stream of second speed readings, across the duration of time to generate the normalized stream of second speed readings.

3. The method of claim 2, further comprising:
    in response to determining the standard deviation between the normalized stream of first speed readings and the normalized stream of second speed readings does not satisfy the threshold:
        obtaining an additional duration of time to be utilized in normalizing the stream of first speed readings and the stream of second speed readings, the additional duration of time being in addition to the duration of time;
        further normalizing the stream of first speed readings and the stream of second speed readings, wherein further normalizing the stream of first speed readings and the stream of second speed readings comprises:
            averaging one or more additional first speed readings, included in the stream of first speed readings, across the additional duration of time to generate the normalized stream of first speed readings; and
            averaging one or more additional second speed readings, included in the stream of second speed readings, across the additional duration of time to generate the normalized stream of second speed readings; and
        determining, based on the further normalized stream of first speed readings and the further normalized stream of second speed readings, an additional standard deviation between the further normalized stream of first speed readings and the further normalized stream of second speed readings.

4. The method of claim 3, further comprising:
    in response to determining the additional standard deviation between the normalized stream of first speed readings and the normalized stream of second speed readings does not satisfy the threshold:
        obtaining a further additional duration of time to be utilized in normalizing the stream of first speed readings and the stream of second speed readings, the further additional duration of time being in addition to the duration of time and being in addition to the additional duration of time.

5. The method of claim 1, further comprising:
    in response to determining the standard deviation between the normalized stream of first speed readings and the normalized stream of second speed readings does not satisfy the threshold:
        obtaining an additional threshold, the additional threshold being in addition to the threshold;
        further normalizing the stream of first speed readings and the stream of second speed readings;

determining, based on the further normalized stream of first speed readings and the further normalized stream of second speed readings, an additional standard deviation between the further normalized stream of first speed readings and the further normalized stream of second speed readings;

determining whether the additional standard deviation between the further normalized stream of first speed readings and the further normalized stream of second speed readings satisfies the additional threshold; and in response to determining the additional standard deviation between the further normalized stream of first speed readings and the further normalized stream of second speed readings satisfies the additional threshold:

generating, based on the further normalized stream of first speed readings and the further normalized stream of second speed readings, the correction factor for the vehicle; and determining, based on the previous tire size of the tires of the vehicle and the correction factor, the updated tire size of the tires of the vehicle.

6. The method of claim 5, further comprising:
in response to determining the additional standard deviation between the further normalized stream of first speed readings and the further normalized stream of second speed readings does not satisfy the additional threshold:

obtaining a further additional threshold, the further additional threshold being in addition to the threshold and being in addition to the additional threshold.

7. The method of claim 1, wherein each first speed reading, included in the stream of first speed readings, is obtained at a first frequency, and wherein each second speed reading, included in the stream of second speed readings, is obtained a second frequency that is different from the first frequency.

8. The method of claim 1, wherein determining the standard deviation between the stream of first speed readings and the stream of second speed readings is in response to determining one or more conditions are satisfied.

9. The method of claim 8, wherein the one or more conditions comprise one or more of: determining the stream of first speed readings is stable for a threshold quantity of first speed readings, or determining the stream of first speed readings is stable for a threshold duration of time.

10. The method of claim 1, wherein determining the standard deviation between the normalized stream of first speed readings and the normalized stream of second speed readings comprises:

comparing one or more normalized first speed readings, from the normalized stream of first speed readings, to one or more normalized second speed readings, from the normalized stream of second speed readings, to determine the standard deviation.

11. The method of claim 1, wherein generating the correction factor for the vehicle based on the normalized stream of first speed readings and the normalized stream of second speed readings comprises:

calculating a ratio based on one or more normalized first speed readings, from the normalized stream of first speed readings, to one or more normalized second speed readings, from the normalized stream of second speed readings; and utilizing the ratio as the correction factor for the vehicle.

12. The method of claim 11, further comprising:
obtaining the previous tire size of tires of the vehicle, wherein the previous tire size of the tires of the vehicle is obtained from the vehicle or from a user of the vehicle; and determining, based on the ratio and based on the previous tire size of the tires of the tires of the vehicle, the updated tire size of the tires of the vehicle.

13. The method of claim 12, wherein causing one or more of the operational parameters of the vehicle to be updated based on the updated tire size of the tires of the vehicle comprises:

generating a tire size signal that includes an indication of the updated tire size of the tires of the vehicle; and causing the vehicle to update one or more of the operational parameters of the vehicle based on the updated tire size of the tires of the vehicle, wherein the one or more operational parameters include one or more of: a speedometer calibration parameter, a transmission calibration parameter, a transfer case gearing parameter, an axle gearing parameter, or an anti-lock brake system (ABS) parameter.

14. The method of claim 1, wherein the first computing device is an in-vehicle computing device of the vehicle, wherein the first speed sensor of the first computing device is a vehicle speed sensor of the in-vehicle computing device of the vehicle, wherein the second computing device is a mobile computing device of a user of the vehicle, and wherein the second speed sensor of the second computing device is a global positioning system (GPS) sensor of the mobile computing device of the user of the vehicle.

15. The method of claim 14, wherein the one or more processors are local to the mobile computing device of the user of the vehicle, wherein the one or more processors are local to the in-vehicle computing device of the vehicle, or wherein the one or more processors are remote from both the mobile computing device of the user of the vehicle and the in-vehicle computing device of the vehicle.

16. A method implemented by one or more processors, the method comprising:

receiving, from a user, user input to automatically determine an updated tire size of tires of a vehicle of the user;

in response to receiving the user input:
generating output that instructs the user to drive the vehicle at a steady speed; and causing the output that instructs the user to drive the vehicle at the steady speed to be provided for presentation to the user via a user interface output device of a mobile computing device of the user or an in-vehicle computing device of the vehicle of the user;

while the user is driving the vehicle:
obtaining a stream of first speed readings of the vehicle, the stream of first speed readings being generated by a vehicular speed sensor of the in-vehicle computing device of the vehicle;

obtaining a stream of second speed readings of the vehicle, the stream of second speed readings being generated by a mobile speed sensor of the mobile computing device;

processing the stream of first speed readings of the vehicle and the stream of second speed readings of the vehicle; and determining, based on a previous tire size of tires of the vehicle and based on processing the stream of first speed readings of the vehicle and the stream of second speed readings of the vehicle, the updated tire size of the tires of the vehicle; and causing one or more operational parameters of the vehicle to be updated based on the updated tire size of the tires of the vehicle.

17. The method of claim 16, further comprising:
while the user is driving the vehicle:
  determining whether the user is driving the vehicle at the steady speed; and
  in response to determining that the user is not driving the vehicle at the steady speed:
    generating additional output that instructs the user to drive the vehicle at the steady speed; and
    causing the additional output that instructs the user to drive the vehicle at the steady speed to be provided for presentation to the user via the user interface output device of the mobile computing device of the user or the in-vehicle computing device of the vehicle of the user.

18. The method of claim 16, further comprising:
in response to determining the updated tire size of the tires of the vehicle based on processing the stream of first speed readings of the vehicle and the stream of second speed readings of the vehicle:
  causing an indication of the updated tire size of the tires of the vehicle to be provided for presentation to the user via the user interface output device of the mobile computing device of the user or the in-vehicle computing device of the vehicle of the user.

19. The method of claim 16, wherein processing the stream of first speed readings of the vehicle and the stream of second speed readings of the vehicle comprises:
  normalizing the stream of first speed readings and the stream of second speed readings;
  determining, based on the normalized stream of first speed readings and the normalized stream of second speed readings, a standard deviation between the stream of first speed readings and the stream of second speed readings;
  determining whether the standard deviation between the normalized stream of first speed readings and the normalized stream of second speed readings satisfies a threshold; and
  in response to determining the standard deviation between the normalized stream of first speed readings and the normalized stream of second speed readings satisfies the threshold, generating, based on the normalized stream of first speed readings and the normalized stream of second speed readings, a correction factor for the vehicle;
  wherein determining the updated tire size of the tires of the vehicle is based on the previous tire size of tires of the vehicle and based on the correction factor for the vehicle.

20. A mobile computing device, comprising:
at least one processor; and
memory storing instructions that, when executed, cause the at least one processor to:
  obtain a stream of first speed readings of a vehicle, the stream of first speed readings being generated by a vehicular speed sensor of an in-vehicle computing device of the vehicle, the in-vehicle computing device being in communication with the mobile computing device;
  obtain a stream of second speed readings of the vehicle, the stream of second speed readings being generated by a mobile speed sensor of the mobile computing device;
  normalize the stream of first speed readings and the stream of second speed readings;
  determine, based on the normalized stream of first speed readings and the normalized stream of second speed readings, a standard deviation between the normalized stream of first speed readings and the normalized stream of second speed readings;
  determine whether the standard deviation between the normalized stream of first speed readings and the normalized stream of second speed readings satisfies a threshold;
  in response to determining the standard deviation between the normalized stream of first speed readings and the normalized stream of second speed readings satisfies the threshold:
    generate, based on the normalized stream of first speed readings and the normalized stream of second speed readings, a correction factor for the vehicle; and
    determine, based on a previous tire size of tires of the vehicle and the correction factor, an updated tire size of the tires of the vehicle; and
  cause one or more operational parameters of the vehicle to be updated based on the updated tire size of the tires of the vehicle.

* * * * *